United States Patent
Kairali et al.

(10) Patent No.: US 12,328,335 B2
(45) Date of Patent: Jun. 10, 2025

(54) FAST FORWARDED SECURITY ISSUE IDENTIFICATION USING DIGITAL TWINS

(71) Applicant: INTERNATIONAL BUSINESS MACHINES CORPORATION, Armonk, NY (US)

(72) Inventors: Sudheesh S. Kairali, Kozhikode (IN); Sarbajit K. Rakshit, Kolkata (IN); Satyam Jakkula, Bengaluru (IN); Sudhanshu Sekher Sar, Bangalore (IN); Maureen Kraft, Hudson, MA (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 17/956,776

(22) Filed: Sep. 29, 2022

(65) Prior Publication Data
US 2024/0114050 A1    Apr. 4, 2024

(51) Int. Cl.
*H04L 9/40*    (2022.01)

(52) U.S. Cl.
CPC ...... *H04L 63/1441* (2013.01); *H04L 63/1416* (2013.01); *H04L 63/1425* (2013.01); *H04L 63/1433* (2013.01)

(58) Field of Classification Search
CPC ............. H04L 63/1441; H04L 63/1416; H04L 63/1425; H04L 63/1433
See application file for complete search history.

(56) References Cited

U.S. PATENT DOCUMENTS

| | | | |
|---|---|---|---|
| 10,454,963 B1 * | 10/2019 | Smith | G06F 16/2477 |
| 10,691,796 B1 | 6/2020 | Stolte | |
| 10,749,888 B2 * | 8/2020 | Carmichael | G06N 20/00 |
| 2007/0192865 A1 * | 8/2007 | Mackin | G06F 21/55 |
| | | | 726/24 |
| 2016/0162690 A1 * | 6/2016 | Reith | G06F 21/577 |
| | | | 726/25 |

(Continued)

OTHER PUBLICATIONS

"Best Practices for MITRE ATT&CK Mapping", Cybersecurity and Infrastructure Security Agency (CISA), Jun. 2021, 20 pages, <https://www.cisa.gov/uscert/sites/default/files/publications/Best%20Practices%20for%20MITRE%20ATTCK%20Mapping.pdf>.

(Continued)

*Primary Examiner* — Kambiz Zand
*Assistant Examiner* — Afaq Ali
(74) *Attorney, Agent, or Firm* — Edward J. Wixted, III (57) ABSTRACT

A method and system provide computer system security for a focus computer system (FCS). The method comprises creating a security digital twin (SDT) for the FCS with an associated security ontology for the FCS. A potential threat analyzer receives a potential threat object (PTO), and maps it to an enterprise attack vector pattern. The method further comprises searching, on another computer system (OCS) for a predicted attack pattern having a similar pattern to the enterprise attack vector pattern. Conditioned upon finding the predicted attack pattern, and using a potential threat handler locating an action mitigation plan (AMP) related to the predicted attack pattern in the data fabric associated with the OCS, the method further comprises copying the OCS predicted attack pattern to an FCS predicted attack pattern store, copying the OCS AMP to an FCS AMP store, and defending the FCS from the PTO using the AMP.

17 Claims, 4 Drawing Sheets

(56) References Cited

U.S. PATENT DOCUMENTS

| | | | |
|---|---|---|---|
| 2016/0277436 A1* | 9/2016 | Lim | H04L 63/1441 |
| 2017/0346839 A1* | 11/2017 | Peppe | H04L 63/1433 |
| 2019/0251267 A1* | 8/2019 | Wysopal | G06F 11/3612 |
| 2019/0387017 A1* | 12/2019 | Martynenko | G06F 21/568 |
| 2020/0412752 A1 | 12/2020 | Shapoury | |
| 2021/0133670 A1* | 5/2021 | Cella | G06N 3/044 |
| 2021/0273978 A1 | 9/2021 | Hadar | |
| 2022/0078204 A1* | 3/2022 | Mori | G06F 21/608 |
| 2022/0078205 A1* | 3/2022 | Bjarnason | H04L 63/1425 |
| 2022/0159033 A1 | 5/2022 | Mizrahi | |

OTHER PUBLICATIONS

"Checking Object Similarity and Equivalence—stix2 3.0.1 documentation", Readthedocs, Printed Jul. 19, 2022, 18 pages, <https://stix2.readthedocs.io/en/latest/guide/equivalence.html>.

"Cybersecurity threats—Can we predict them?", Research Features, Jul. 9, 2018, 7 pages, <https://researchfeatures.com/2018/07/09/cybersecurity-threats-can-we-predict-them/>.

"Predicting terrorist behaviors with more than 90 percent accuracy: Understanding terrorist behaviors and detecting suspicious attacks", Science Daily, Mar. 2, 2017, 4 pages, <https://www.sciencedaily.com/releases/2017/03/170302115740.htm>.

"Resource Development", last modified Sep. 30, 2020, 6 pps., <https://attack.mitre.org/tactics/TA0042/>.

"The IMDDOS Botnet: Discovery and Analysis", Damballa Threat Research, Copyright 2010, Damballa, Inc All Rights Reserved, 19 pps., <https://www.coresecurity.com/sites/default/files/private-files/publications/2017/03/Damballa_Report_IMDDOS.pdf,>.

"Understand the MITRE to STIX data model", Rome, 2 pps., last updated: Dec. 6, 2021, <https://docs.servicenow.com/bundle/rome-security-management/page/product/threat-intelligence/reference/understand-the-mitre-to-stix-data-model-mapping.html>.

"Understand the MITRE to STIX data model", Service Now, Printed Jul. 19, 2022, 3 pages, <https://docs.servicenow.com/bundle/rome-security-management/page/product/threat-intelligence/reference/understand-the-mitre-to-stix-data-model-mapping.html>.

"Why Prediction, and Not Detection, Is the Key to Reducing Email Risk", Information Security Buzz, May 3, 2019, 7 pages, <https://www.informationsecuritybuzz.com/articles/why-prediction-and-not-detection-is-the-key-to-reducing-email-risk/>.

Barnum, Sean, "Standardizing Cyber Threat Intelligence Information with the Structured Threat Information eXpression (STIX™)", Feb. 20, 2014, MITRE, Version 1.1, Revision 1, 22 pps., <https://stixproject.github.io/about/STIX_Whitepaper_v1.1.pdf>.

Dietz et al., "Employing Digital Twins for Security-by-Design System Testing", Proceedings of the ACM Workshop on Secure and Trustworthy Cyber-Physical Systems (SaT-CPS 2022), Apr. 27, 2022, Baltimore, MD, 10 pages, <https://dl.acm.org/doi/abs/10.1145/3510547.3517929>.

Manky, Derek, "Combining AI and Playbooks to Predict Cyberattacks", Threat Post, Dec. 26, 2019, 7 pages, <https://threatpost.com/combining-ai-playbooks-predict-cyberattacks/151367/>.

Marshall, Patrick, "Predicting suicide attacks by analyzing similarities", GCN, Mar. 17, 2017, 6 pages, <https://gcn.com/blogs/emerging-tech/2017/03/analyzing-terrorist-patterns.aspx>.

Schaeck, Thomas, "AI applications optimizing actions based on data and predictions with Palantir for IBM Cloud Pak for Data", IBM Developer Blog, Published Mar. 15, 2021, Updated Sep. 23, 2021, 15 pages, <https://developer.ibm.com/blogs/data-and-ai-applications-with-palantir-for-ibm-cloud-pak-for-data/>.

Walmsley, Matt, "Applying AI to Detect and Hunt Advanced Attackers", Vectra, Printed Jul. 19, 2022, 22 pages, <https://docbox.etsi.org/Workshop/2019/201906_ETSISECURITYWEEK/1906_AI_SECURITY/S02_AI_ATTACK_DEFENSE/AI_HUNT_ADVANCED_ATTACK_VECTRA_WALMSLEY.pdf>.

* cited by examiner

FAST FORWARDED SECURITY ISSUE IDENTIFICATION USING DIGITAL TWINS

BACKGROUND

Disclosed herein is a system and related method for fast forwarded security issue identification using security digital twins (SDTs). In particular, the system and method use a partnering of SDTs, including systems deployed via a hybrid cloud methodology. The hybrid cloud model's heterogenous deployments may host hundreds of similar systems in terms of security architecture by various customers.

SUMMARY

Disclosed herein is a method for providing computer system security for a focus computer system (FCS). The method comprises using a system security processor associated with the FCS, and creating, using a digital twin creator, a security digital twin (SDT) for the FCS with an associated security ontology for the FCS. A potential threat analyzer receives a potential threat object (PTO), and maps it to an enterprise attack vector pattern. The method further comprises searching, using a similarity searcher and search routines associated with an other computer system (OCS), for a predicted attack pattern having a similar pattern to the enterprise attack vector pattern. The similarity of the pattern is determined according to a predefined similarity criteria. Conditioned upon finding the predicted attack pattern, and using a potential threat handler locating an action mitigation plan (AMP) related to the predicted attack pattern in the data fabric associated with the OCS, the method further comprises copying the OCS predicted attack pattern to an FCS predicted attack pattern store, copying the OCS AMP to an FCS AMP store, and defending the FCS from the PTO using the AMP.

Disclosed herein is also a computer system security apparatus, comprising a memory, and a focus computer system (FCS) processor. The processor is configured to create, using a digital twin creator, a security digital twin (SDT) for the FCS with an associated security ontology for the FCS. A potential threat analyzer receives a potential threat object (PTO), and maps the PTO to an enterprise attack vector pattern. A similarity searcher uses search routines associated with an other computer system (OCS), for a predicted attack pattern having a similar pattern to the enterprise attack vector pattern. The similarity of the pattern is determined according to a predefined similarity criteria. Conditioned upon finding the predicted attack pattern, a potential threat handler is used to locate an action mitigation plan (AMP) related to the predicted attack pattern in the data fabric associated with the OCS, copy the OCS predicted attack pattern to an FCS predicted attack pattern store, copy the OCS AMP to an FCS AMP store, and defend the FCS from the PTO using the AMP.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

The following general acronyms may be used below:

TABLE 1

| General Acronyms | |
|---|---|
| CD-ROM | compact disc ROM |
| CPP | computer program product |
| DVD | digital versatile disk |
| EPROM | erasable programmable read-only memory |
| EUD | end-user device |
| IoT | Internet of Things |
| LAN | local-area network |
| NFC | near field communication |
| RAM | random access memory |
| ROM | read-only memory |
| SAN | storage area network |
| SD | secure digital |
| SDN | software-defined networking |
| SRAM | static random-access memory |
| UI | user interface |
| USB | universal serial bus |
| VCE | virtual computing environment |
| WAN | wide-area network |

Data Processing System in General

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
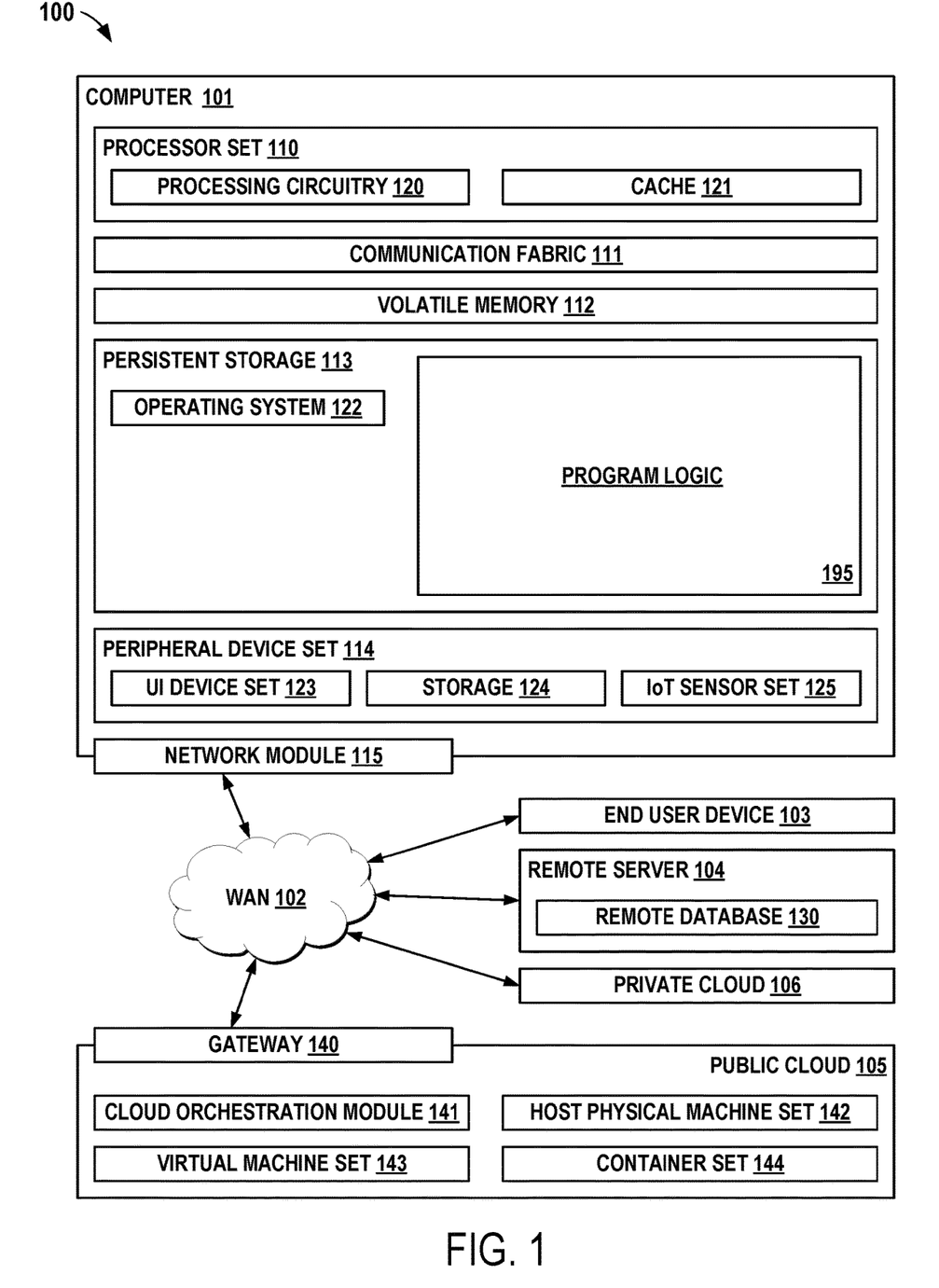
FIG. 1 is a block diagram of a general computing device and environment.

FIG. 1 is a block diagram of a general computing device and environment. Computing environment 100 contains an example of an environment for the execution of at least some of the computer code involved in performing various program logic 195. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and program logic 195, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the described embodiments. The terminology used herein has been chosen to best explain the principles of the embodiments, the practical application or technical improvement over technologies found in the marketplace, or to enable others of ordinary skill in the art to understand the embodiments disclosed herein.

Fast Forwarded Security Issue Identification Using Digital Twins

System Overview

The following application-specific acronyms may be used below:

TABLE 2

Application-Specific Acronyms

| | |
|---|---|
| API | application program interface |
| EAV | enterprise attack vector |
| FCS | focus computer system |
| OCS | other computer system |
| OWASP | Open Web Application Security Project |
| PTO | potential threat object |
| SCC | Specialist Computer Centres, Plc. |
| SDT | security digital twin |
| SSP | system security processor |
| STIX ™ | Structured Threat Information Expression |
| UI | user interface |

The hybrid cloud model's heterogenous deployments may host hundreds of similar systems in terms of security architecture by various customers. At present, the ability to systematically check system security similarity and assist other systems automatically is limited. It would be beneficial if similarly situated systems could take advantage of shared security information. In order to do so, however, it may be helpful to consider relevant security-related questions without investing significant manual effort. These questions may include:
   a) how does a current (also referred to herein as "focus") system's security posture compare to a similar neighbor's system's security posture?
   b) can a focus system's security controls be copied from other systems to improve the focus system? and
   c) is a focus system vulnerable to some cyber threats or even larger campaigns?

The security posture referenced herein refers to an organization's overall cybersecurity strength and how well it can predict, prevent, and respond to ever-changing cyber threats. The security posture is reflected in an SDT and the security ontology used to describe a particular computer system.

At present, there is no automated framework that allows one to easily answer these questions. At best, only parts of these questions may be answered, and any limited answers to these questions are obtained inefficiently. The answers may often involve much manual work and handshaking with system administrators of similar systems. Usually, it is a very lengthy and effort-filled journey between a compromise and breach of a system. And when attacks occur, there are often many systems under similar attack, straining resources when they are needed most.

A digital twin is a virtual representation of an object or system that spans its lifecycle, is updated from real-time data, and uses simulation, machine learning and reasoning to help decision-making. The SDT is a digital twin that incorporates various security aspects associated with a computer system. The SDT may serve as a proxy for a real-world system with regard to security-related issues.

It is advantageous for systems to share information about attacks with one another. MITRE ATT&CK® is a globally-accessible knowledge base of adversary tactics and techniques based on real-world observations. The Open Web Application Security Project (OWASP) is an online community that produces freely-available articles, methodologies, documentation, tools, and technologies in the field of web application security. Penetration testing, also known as pen testing, security pen testing, and security testing, is a form of ethical hacking. The pen test attempts to pierce the armor of an organization's software, services, or cyber defenses, checking for exploitable vulnerabilities in networks, web apps, and user security.

At present, the hybrid cloud may model heterogenous deployments hosts having hundreds of similar systems in terms of security architecture by various customers. Disclosed herein is a system and method by which similarity checks can be done on attack progress on a different system and use the predictions associated with this attack to fast-forward to a mitigation. Since such attacks are typically on multiple users and systems, it would be beneficial to face the attacks as a community. Thus, known prediction methodology may be employed in the solution.

A proposed solution may have an SDT for every hybrid cloud-based deployment (specifically the computer systems described herein) which will collect the data and then build a threat security ontology of the computer system (e.g., a cloud-or hybrid-cloud-based deployment) and convert it to threat vectors and use it to run a similarity check with other similar deployment's threat vectors, and then fetching the commonalities between the two based on the similarity check. The system brings in information regarding all the controls applied by similar systems and these controls will be recommended back to be applied to the focus computer system. The system will also use predictions with some added ontological changes, and then see what additional controls might be required to mitigate the risk if this risk is being presented. Some of these risk mitigations strategies would otherwise takes weeks of planning to get identified, whereas according to novel aspects disclosed herein, the system will be able to learn it from neighbors. The system may also use masking, redaction, differential privacy, encryption, etc., to obscure sensitive data while preparing the ontology so that the privacy of the whole data that is being used to run the similarity check is under an expected compliance level.

Advantageously, the present disclosure provides, according to some embodiments, a framework that allows: (a) checking how a current system's security posture compares to a similar neighbor's system's posture; (b) some security controls may be copied to improve a current system; and (c) the vulnerability of the focus system to some cyber threats or even larger campaigns. These determinations may be made without investing a significant amount of manual effort.

In known systems, for some of these questions, partial answers may be found, but even then, addressing them includes a great deal of manual work and handshaking with similar systems' administrators. Usually, it is a very length journey between compromise and breach, and there may be many other computer systems under a similar attack. There are no ways to systematically check similarity and help each other automatically.

Disclosed herein, and according to some embodiments, an SDT is provided for cloud, hybrid cloud, and other network-based based deployments that collect computer system data, build a threat/security ontology, and convert the security ontology to threat vectors/predicted attack patterns. A PTO may then be used and use it to run a similarity check with other similar deployments' threat vectors and fetching the commonalities. The system may bring in information regarding all the controls applied by the other similar systems, and these controls may be recommended back to be applied to the focus system.

In some embodiments, the system may also use predictions with some added ontological changes and then it may be determined what additional controls might be required to mitigate such a risk if it is presented. Some of these risk mitigations strategies may otherwise (in known approaches) take weeks of planning to be identified, whereas the systems disclosed herein may be able to learn it from neighbors quickly. The system may also use masking, redaction, differential privacy, encryption, etc., while preparing the ontology so that the privacy of the whole data that is being used to run the similarity check are under a compliance level that is expected.

Various embodiments disclosed herein utilize the SDT for information about a computer system. The system may have the capability to build an SDT, which may contain all the security objects and ontologies of a system that it represents. However, for security purposes, these SDTs may have masked, redacted, and partially encrypted data sufficient to carry put simulations and similarity searches. Multiple such SDTs may be able to search each other and collaborate.

In some embodiments, a searchable security ontology is built in an SDT-based platform. Various embodiments of the system send detected PTOs to an SDT and a system security processor (SSP) that implements various embodiments disclosed herein. This could be done as part of pen testing or even live log analysis. This could be done by integrating capabilities like Security Insights in SCC. Once the SSP gets these PTOs, the SSP may map these objects to enterprise attack vectors. Then attack vectors may also be mapped to a threat intelligence exchange format for external search.

Use Case

The following use case is referenced below to illustrate various features according to embodiments described herein, although other use cases in, e.g., the MITRE framework may also be applicable. In the use case, a current/focus system has an application, Software X, version 7.5 (v. 7.5) installed on it. However, v. 7.5 has a particular vulnerability in that when a particular command sequence is remotely entered with Software X in a particular computer system state, it grants the software user greater privileges than they should be allowed. A new version of Software X, v. 7.6, is available that fixes this vulnerability. This use case is only used as an example and for purposes of clarity, and the inventive aspects described herein are not limited to handling only this use case, but rather can handle any other security threat as would be understood by those of ordinary skill in the art.

System Description

Figure 2:
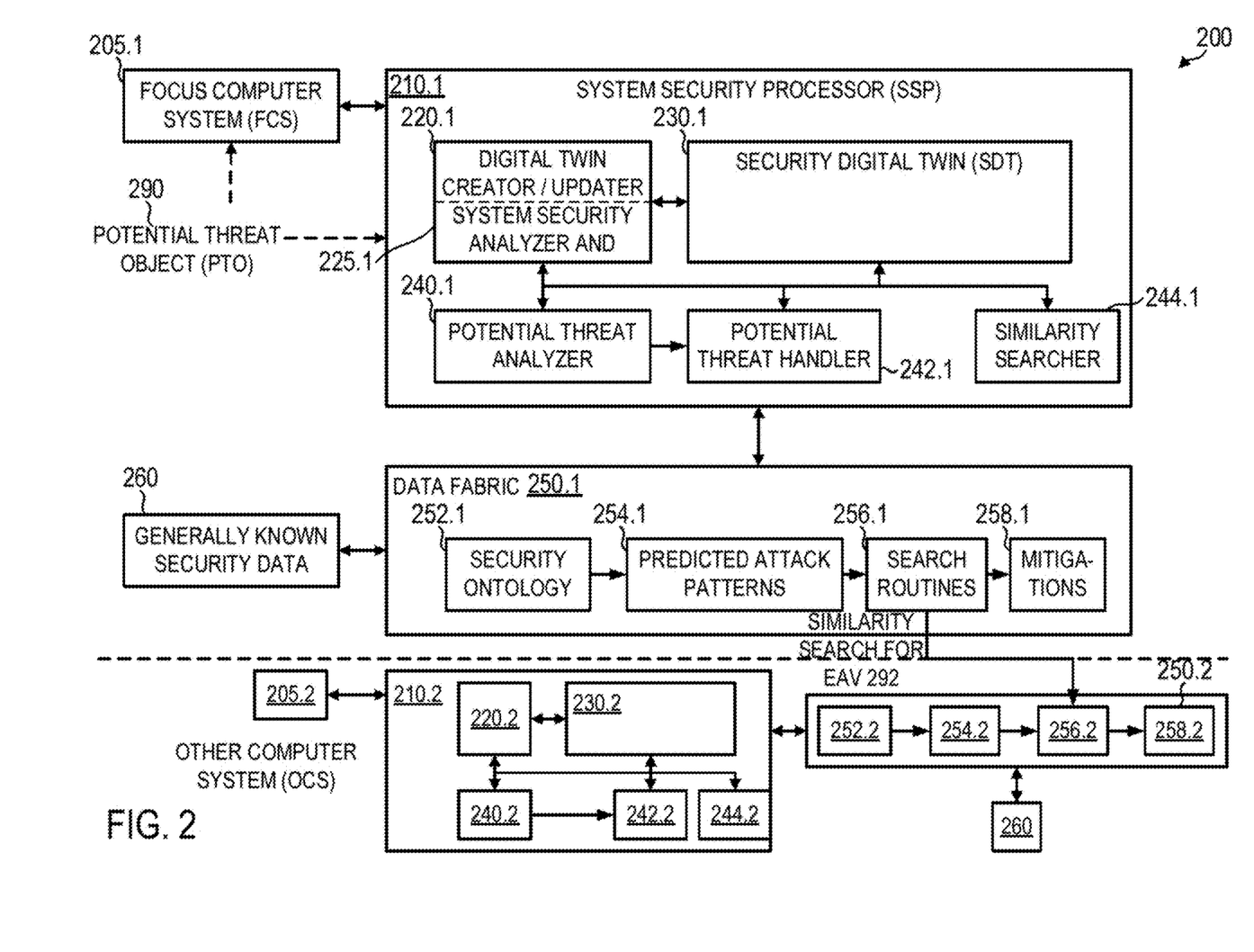
FIG. 2 is a block diagram illustrating various features of disclosed embodiments.

FIG. 2 is a block diagram illustrating various components of a security system, according to various embodiments disclosed herein. FIG. 2 shows an environment 200 within which two computer systems execute: the first computer system, also referred to as the current or focus computer system 205.1, is used as an example computer having a particular software vulnerability; and the second computer system 205.2, also referred to as an other computer system 205.2, is used as an example computer potentially having relevant information about resolving the particular software vulnerability. The second/other computer system 205.2 is accessible from the first/focus computer system 205.1 either directly or indirectly via a network of the environment 200.

Reference numbers ending with a "0.1", e.g., 205.1, relate to the focus computer environment, and reference numbers ending with a "0.2", e.g., 205.2, relate to the other computer(s)'s environment. However, in some instances, certain elements may be referred to herein solely by the first number, e.g., 205, in which case reference is being made either to the group of elements collectively, or an arbitrary element representatively.

The computing environment 200 may be an example of the computing environment 100, and the computer systems 205 may be examples of the computer 101, each of these examples including some or all of the general elements discussed above.

The embodiments described herein may be implemented by an SSP 210 in combination with a data fabric 250 that may be used to build the SDT 230 (the data fabric 250 may be a part of the SSP 210, or it may be a separate element that is accessible by the SSP 210). The data fabric 250 provides an architectural approach to simplify data access in an organization to facilitate self-service data consumption. This architecture is agnostic to data environments, processes, utility and geography, all while integrating end-to-end data-management capabilities. A data fabric automates data discovery, governance and consumption, enabling enterprises to use data to maximize their value chain. With a data fabric, enterprises elevate the value of their data by providing the right data, at the right time, regardless of where it resides.

The SDT 230 and elements used to interact with the SDT 230 may be a part of the SSP 210. The SSP 210 and data fabric 250 may be implemented as the program logic 195 and may execute on a same or a different computer than the FCS 205.1. The FCS 205.1, an other computer system (OCS) 205.2, and the respective systems for the SSP 210 and data fabrics 250 may all be run on a computer 101, as described above. The SSP 210.2 and data fabric 250.2 of the OCS 205.2 may contain the same or similar functionality of the SSP 210.1 and data fabric 250.1 of the FCS 205.1, although the security data contents may differ. Since the SSP 210 and data fabric 250 components may operate in a similar manner, they will be discussed generically below, except where an interaction between them is performed.

Security Digital Twin

According to various embodiments disclosed herein, a digital twin creator 220 is configured to build an SDT 230 from data of a given system, such as the FCS 205.1. The SDT 230 may, in some embodiments, be created and updated by fetching the security posture of the computer system 205 continuously and creating a representative of this posture. The updating may be performed in real-time, or at least whenever a substantive change in the system impacting security changes, such as new software/operating system/hardware installs or updates are performed. The digital twin creator 220 may utilize mapping techniques to, e.g., map between, e.g., business objects and MITRE objects, as described in the U.S. Government's Cybersecurity & Infrastructure Security Agency (CISA) publication, Best Practices for MITRE ATT&CK® Mapping, published June 2021, https://www.cisa.gov/uscert/sites/default/files/publications/Best%20Practices%20for%20MITRE%20ATTCK%20Mapping.pdf, downloaded Sep. 18, 2022, whose techniques for mapping are herein incorporated by reference, by way of example.

In order to help protect the security of data in the computer system 205, prior to the mapping (for both creating and updating the SDT 230), a system security analyzer 225 may assist the digital twin creator 220 in recognizing certain data should be cleansed to avoid any privacy challenges. The system security analyzer 225 may redact and mask confidential or sensitive content of the computer system 205 before it is placed in the SDT 230, and the data may be, e.g., mapped to data objects, such as the MITRE objects described above. This data may then be made available or placed in, e.g., the security ontology 252, which may be represented in no-code applications-based dashboards (such as Palantir), as discussed below.

The digital twin creator 220 may access configuration information of the computer system 205 and create information about hardware, firmware, operating systems, software, and the like. Such information may include, e.g., manufacturer, name of entity, components of entity, model number, serial number, build date, version number, etc. For example, in the use case, the digital twin creator 220.1 may include the Software X v 7.5 software entity installed on the focus computer system 205.1 into the SDT 230.1. Some of this information may be stored in the security ontology 252.1 associated with the SDT 230.1.

In some embodiments, the SDT 230 is built to comprise all of the security objects and ontologies of the computer system 205. The digital twin creator 220 may also serve as an updater, such that when changes are made to the computer system 205, the SDT 230 is kept in sync. The SDTs 230 for the systems 205 may be configured to have data that may include the masked, redacted, and partially encrypted data sufficient to perform simulations and similarity searches. Multiple such SSPs 210.1, 210.2 may be configured to search each other and collaborate with one another.

Building the Searchable Security Ontology in a Security Twin-Based Platform

The FCS 205.1 and/or the SSP 210.1 may receive a PTO 290. In the use case, this may be the particular command sequence of Software X v. 7.5 that has the particular vulnerability. The PTO 290 may be detected in a normal course of operating Software X, or it may be provided by a testing component (not shown), such as a pen tester, expressly designed to seek out vulnerabilities. The testing component may be used to send PTOs 290 representing known vulnerabilities to the SSP 210.1, or it may simply send random objects and/or attack vectors in an attempt flesh out such vulnerabilities. PTOs 290 may be sent as part of pen testing or live log analysis. This could be done by integrating security information and service capabilities from service providers, such as Security Insights® from Specialist Computer Centres, Plc. (SCC) as a part of the generally known security data 260 obtained from external sources. The potential threat analyzer 240.1 may take the general security data 260 and organize it into the security ontology 252.1 and map various threat objects, such as the MITRE objects, in the security ontology 252 into enterprise attack vectors (EAVs) and store them in the predicted attack patterns 254. The EAVs may also be mapped into a threat intelligence exchange format for search purposes. An EAV for the PTO 290 may also be created and compared against those in the predicted attack patterns 254.1. This may thus assist in predicting attacks from threat objects 290.

Attack Pattern Progression Analysis Based on Similarity Searches

The SSPs 210 for the SDTs 230 described herein are able to interact with other SSPs 210 for other SDTs 230. They may be able to search for information using standard protocols, e.g., the Structured Threat Information Expression (STIX™) protocol, which is a structured language for describing cyber threat information so it can be shared, stored, and analyzed in a consistent manner on different systems. See Barnum, Sean, Standardizing Cyber Threat Intelligence Information with the Structured Threat Information eXpression (STIX™), Version 1.1, Revision 1, Feb. 20, 2014, https://stixproject.github.io/about/STIX_Whitepaper_v1.1.pdf, downloaded Sep. 17, 2022 ("The STIX Whitepaper"). At a high level, the STIX language consists of nine key constructs and the relationships between them. Although STIX is used as an example, other protocols, languages, and formats may be used as well.

The predicted attack patterns 254 and PTOs 290 may then be converted to, e.g., STIX objects, as described in the ServiceNow paper, Understand the MITRE to STIX Data Model, https://docs.servicenow.com/bundle/rome-security-management/page/product/threat-intelligence/reference/understand-the-mitre-to-stix-data-model-mapping.html, downloaded Sep. 18, 2022. STIX focuses on interoperability of threat information between various sources that produces threat information. STIX can represent the attack vectors in such a way that multiple systems can read and interpret it, in a way similar to how XML makes data transfer easier between systems. STIX makes threat information inter operable between various STIX supporting security systems.

To perform a search, such as a STIX search within a STIX database, search routines that use, e.g., application program interfaces (APIs) 256 may be used to locate other SDTs 230 of other computer systems 205 that have similar features. This model can be applied to on premise deployments—in this case, a STIX API or other search routine should be externally accessible. A computer system (or hybrid deployment) may be considered as an "on-premise" deployment when data is stored on an entity's own servers, and the entity installs and manages the software system.

In the use case, a search may be performed by the SSP 210.1 for relevant threats. Here, the PTO 290 is a series of commands for Software X. The potential threat analyzer 240.1 invokes a similarity searcher 244.1 that utilizes the search routines 256.2 associated with the SSP 210.2 and SDT 230.2 for the OCS 205.2. In this situation, it is very likely that there would be a plurality of OCSs 205, or, rather, their SDTs 230.2 and data fabrics 250.2 that could be searched for potential mitigations 258.2.

The system security processor 210.1 receiving the PTO 290 may use a similarity searcher 244.1 to search the SDT 230.2 and the data fabric 250.2 associated with the OCS 205.2. This may be done, e.g., by the similarity searcher 244.1 accessing search routines 256.2, using, e.g., search APIs in order to access the data fabric 250.2 and SDT 230.2 for its security data.

Figure 3:
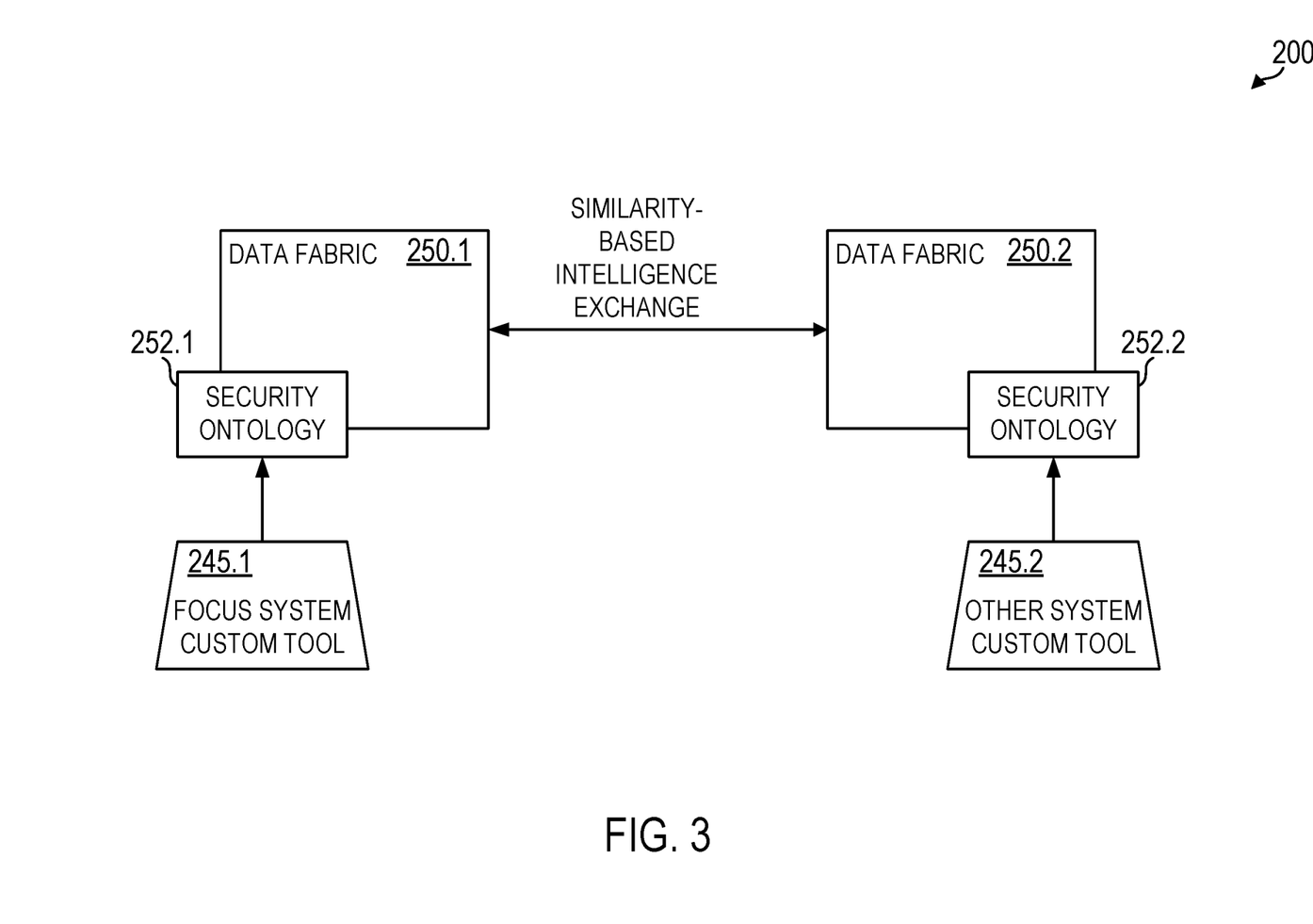
FIG. 3 is a block diagram illustrating communication of various security aspects between related systems.

In various embodiments, all the paired systems may have access to the SDTs 230 and data fabric 250 platform of other participating systems. In various embodiments, each customer having a computer system 205 may bring in their own tooling (i.e., custom security tools), etc. For example, if a customer has a security tool that manages network security threat information, this tooling may be utilized with various embodiments described herein. In FIG. 3, a focus system custom tool 245.1 may provide the access to its security ontology 252.1 within its data fabric 250.1 by the other system. Similarly, an other system custom tool 245.2 may provide the access to its security ontology 252.2 within its data fabric 250.2 by the focus (or other) computer systems. In this way, the customers may get their user interface (UI) pages where the security ontology 252 and predicted attack patterns 254 may be displayed. This information may then be paired with platform level information that will be fetched from similar other users/customers via their security ontology 252 and predicted attack patterns 254 who opted to participate in this system using the system security processor 210.

When the similarity searcher 244.1 of the FCS 205.1 hits the search routines 256.2 of the OCS 205.2 and its security data, it may identify similarities between the security ontology 252.1 of the FCS 205.1 and the security ontology 252.2 of the OCS 205.2. If similarity is found, based on some predefined similarity criteria, then the security ontology 230.2 associated with the other computer system 205.2 may be investigated and the system security processor 230.1 may be provided with information regarding how this pattern for the attack vector may progress further. Based on the nature of the attack progress from the PTO 290, a similarity can be searched. The predefined similarity criteria threshold, in some embodiments, may relate to a percentage of commonality in the security ontologies 252 of two systems 205. For example, the systems 205 could be considered relevant and/or related if they share 80% of their attributes. A search hitting the predefined similarity criteria threshold may permit sharing of relevant mitigation data 258.2 (and other data fabric 250.2 or SDT 230.2 data) with the SSP 210.1 of the FCS 205.1 the other computer system 205.2 to share its information from its SDT 230.2 and data fabric 250.2 with the system security processor 210.1 of the focus computer system 205.1. This allows the focus computer system 205.1 to benefit from the security data associated with the other computer system 205.2 via, e.g., its SDT 230.2. The SDT 230.1 of the FCS 205.1 may be applied as part of its data fabric 250.1 as a service, where the OCS 205.2 and its system security processor 210.2 may act as a service provider that pairs and provides search routines 256.2 that allows similarity searches across its security information in the data fabric 250.2 or its SDT 230.2. The STIX objects may be pre-prepared for a search based on a history of other system security processors' 210 search queries. In some embodiments, the predefined similarity criteria threshold may be related to an attack vector progress similarity. For example, if the FCS 205.1 and the OCS 205.2 are participating in a STIX similarity search, the API may be the standard STIX-compatible API exposed by the FCS 205.1 and the OCS 205.2. Information that is exchanged in this situation is STIX compatible data. The similarity search may then be based on the attack patterns (recorded+predicted ones). Attack vectors may be recorded in the digital twin continuously. Here, via the STIX API, one digital twin may search in the other digital twin, and the FCS 205.1 may do a similarity check of its recorded/predicted attack vectors to the OCS 205.2 via a STIX API call.

The similarity searcher 244.1 of the FCS 205.1 may further search for similarity between the EAV associated with the PTO 290 using the OCS 205.2 search routines 256.2. In this case, the similarity of the EAV would be compared to various predicted attack patterns 254.2 that the data fabric 250.2 of the OCS 205.2 may have. If a close enough of a match is found (e.g., the 80% predefined similarity criteria noted above), then this might be considered relevant enough for the SSP 210.2 of the OCS 205.2 to share a mitigation strategy from its mitigations 258.2 with the requesting SSP 210.1 of the FCS 205.1.

In the case of using a hybrid cloud deployment model (or other cloud or networked model)—this could be a coordinated attack across multiple sites. SSP 210.1 may be able to detect patterns of, or associated with, one or more PTOs 290 and perform further investigation and resolution. Techniques may be used according to Resource Development, https://attack.mitre.org/tactics/TA0042/, created Sep. 30, 2020, downloaded Sep. 28, 2022. Resource Development discusses techniques that involve adversaries creating, purchasing, or compromising/stealing resources that can be used to support targeting. Such resources include infrastructure, accounts, or capabilities. These resources can be leveraged by the adversary to aid in other phases of the adversary lifecycle, such as using purchased domains to support Command and Control, email accounts for phishing as a part of Initial Access, or stealing code signing certificates to help with Defense Evasion.

Returning to the use case, the potential threat analyzer 240.1 associated with the FCS 205.1, determines a potential danger with the command sequence associated with Software X v. 7.5 (the PTO 290) and invokes the similarity searcher 244.1 to find similarities on OCSs 205.2 (or rather data within their SDTs 230.2/data fabrics 250.2). In this case, a similarity is found in that a particular OCS 205.2 has information about Software X, and in particular, that Software X v. 7.6 fixes a number of security issues, including those of the particular problematic sequence of commands. Thus, a mitigation from the mitigations 258.2 may be returned to the SSP 210.1 that recommends updating Software X from the manufacturer's website to v. 7.6. The potential threat handler 242.1 on the FCS 205.1 may then undertake the recommended update on the FCS 205.1, thus protecting the FCS 205.1 from the PTO 290. The digital twin creator/updater 220.1 may then update the SDT 230.1 and the data fabric 250.1 with the updated version of Software X being installed on the FCS 205.1.

Fast-Forwarded Attack Pattern Investigation

In some embodiments, the SSP 210 may provide capabilities for the potential threat analyzer 240 and potential threat handler 242 using no code or low code capabilities. One example might implement IBM's Palantir for IBM Cloud Pak®, which may be used to accelerate predictive, data-driven insights to improve access to relevant data, and to leverage AI—with such a solution, users of all skills can translate raw data into business concepts through a unifying ontology and build AI applications in a low/no-code environment. In some embodiments, IBM's Cloud Pak for Data (CP4D®) (a private cloud solution) may be used as a native cloud solution that can be deployed as a stand-alone Kubernetes-based IBM Cloud Private cluster or as a service in your existing IBM Cloud Private cluster. Using these or similarly functional products, system administrators may be able to investigate various predicted attack patterns 254 and to further check whether a particular attack pattern 254 may constitute a coordinated attack campaign if, e.g., some missing element were to be added.

Campaigns are instances of ThreatActors pursuing an intent, as observed through sets of Incidents and/or TTP, potentially across organizations. In a structured sense, Campaigns may consist of the suspected intended effect of the adversary, the related TTP leveraged within the Campaign, the related Incidents believed to be part of the Campaign, attribution to the ThreatActors believed responsible for the Campaign, other Campaigns believed related to the Campaign, confidence in the assertion of aggregated intent and characterization of the Campaign, activity taken in response to the Campaign, source of the Campaign information, handling guidance, etc. See, e.g., The STIX Whitepaper and The IMDDOS Botnet: Discovery and Analysis, https://www.coresecurity.com/sites/default/files/private-files/publications/2017/03/Damballa_Report_IMDDOS.pdf, downloaded Sep. 28, 2022, p. 10 illustrating a campaign. If this step was only missing in the STIX info and if system has published campaign details already it could conclude that adding "Launches DDOS against the TARGET" makes it a fully qualified campaign and also it can predict that a next step (e.g., step ten) is the next possibility.

Using this, system administrators may be able to visually analyze a predictable future of a current attack or potential attack and prepare for mitigation 258 of these attack patterns 254.

Building an Automated Mitigation Plan Via Twin Eco System

Once the above-described similarity threshold is established, the potential threat handler 242 may first recommend a mitigation plan(s) 258.2 of the other system's 205.2 mitigations 258.2 based on an already applied or a known successful mitigation plan associated with the other system's SDT 230.2. Second, if the PTO 290 is determined by the potential threat analyzer 240 to be a part of a coordinated campaign attack, the system security processor may use the fast-forwarded attack pattern investigation described above and allow system administrators to predict the possible mitigations in each route of progress of the coordinated attack. This may be determined based on, e.g., the similarity %, where the threshold can be set by the system administrator. For example, in the above example campaign, if the threshold is set as 90%—and since ten steps are present, any other digital twin will need a similar nine steps to assume similarity, Third, a system administrator may also be able to add a new mitigation plan 258. The advantage with this approach is that this new mitigation plan 258 may provide a stronger match in similarity searches 244, 256 and this new mitigation plan may then benefit multiple computer systems 205.

Fast-Forwarded Warnings Based on Similarity in History

As more computer systems 205 are provided with the system security processor 210 and provide access to/from the data fabric 250, the base of data in the data fabric 250, including the security ontologies 252, predicted attack patterns 254, and mitigations 258 becomes larger, and FCSs 205.1 will be able to check other computer systems 205.2 that had previously faced similar attacks (or made similar inquires) and used similar mitigation methods 258.2. The potential threat handler 242.2 may warn focus customers having a focus computer system 205.1 who do not yet have a benefit of the best mitigation 258.2 for an attack that is in progress from a potential threat object 290 by accessing the mitigations 258.2 on other computer systems 205.2 of other customers whose security ontologies 252.2 have a high similarity the security ontology 252.1 of the focus computer system 205.1 for a focus customer who is currently under attack. The SSP 230.2 associated with the OCS 205.2 may share the best mitigation 258.2 with the SSP 230.1 associated with the FCS 205.1, which may then utilize the best mitigation 258.2 to avert an attack or simply to add it to its own mitigation store 258.1.

In some embodiments, the potential threat handler 242.2 of the other system 205 that has the benefit of a mitigation 258.2 for a particular predicted attack pattern 254.2 may broadcast this information to multiple other computer systems 205.

Figure 4:
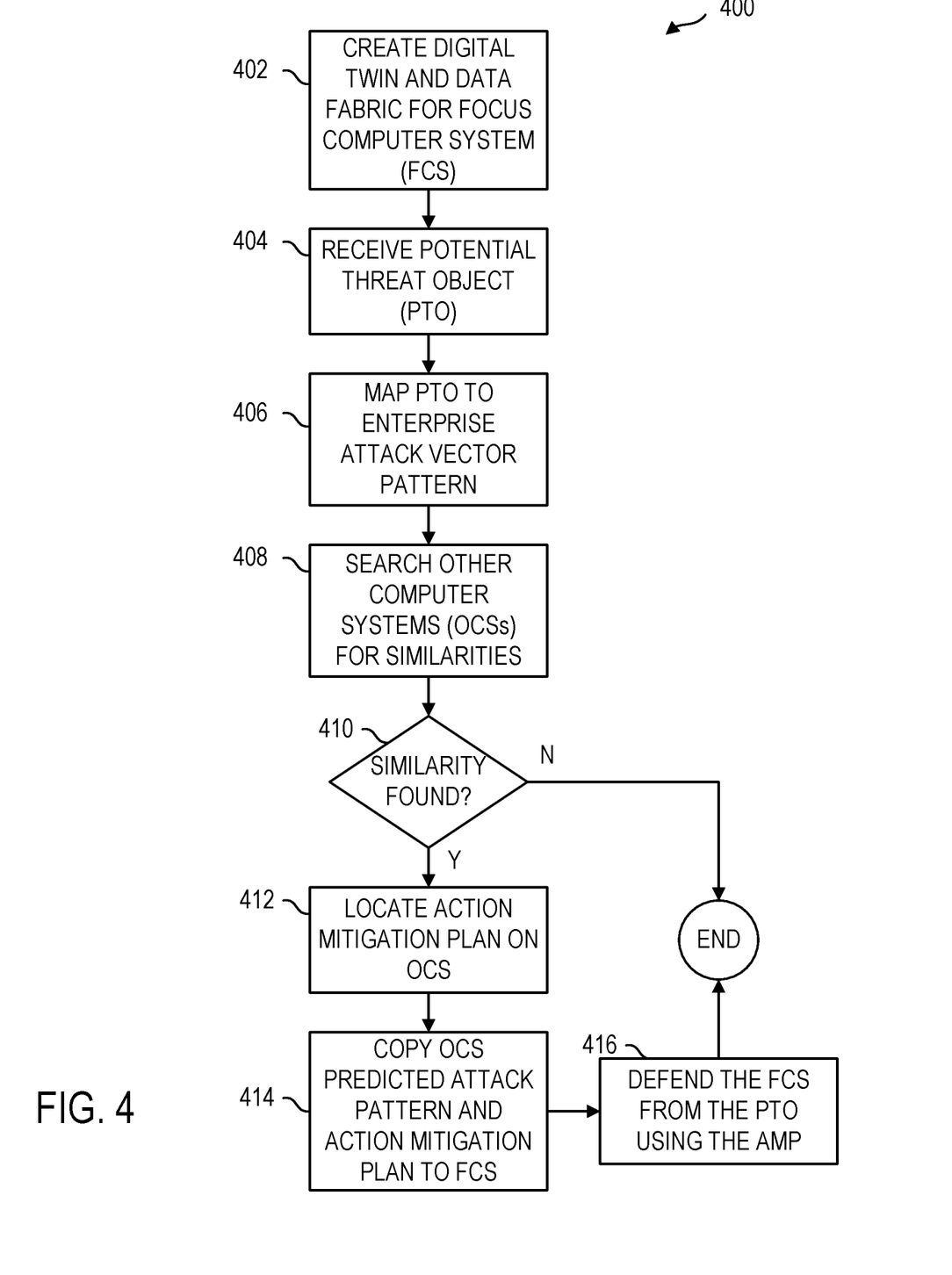
FIG. 4 is a flowchart illustrating an example process according to some embodiments.

FIG. 4 is a flowchart illustrating an example process 400 according to some embodiments and based on the above description. In operation 402, the digital twin creator 220. creates the SDT 230.1 and data fabric information 250.1 from the FCS 205.1. In operation 404, a PTO 290 is received by the SSP 210.1 and is analyzed by the potential threat analyzer 240.1. In operation 406, the PTO 290 is mapped to an enterprise attack vector pattern, and the enterprise attack vector pattern is used in operation 408 to search OCSs 205.2 for similarities with the enterprise attack vector pattern using search routines 256.2 of the OCS 205.2. If no similarity is found 410: N, then the process ends. Otherwise, 410: Y, the SSP 210.2 associated with the OCS 205.2 may, in operation 412, locate and return a mitigation plan stored within its mitigation store 258.2. In operation 414, the SSP 210.1 of the FCS 205.1 may copy the predicted attack pattern and the action mitigation plan into its own data fabric 250.1, and then, in operation 416, use the newly acquired mitigation plan 258.1 to defend against the PTO 290.

TECHNICAL APPLICATION

The one or more embodiments disclosed herein accordingly provide an improvement to computer technology, namely to an improvement to sharing security provisions across a network of computers.

What is claimed is:
1. A computer-implemented method comprising:
creating a first security digital twin (SDT) for a focus computer system (FCS) with an associated security ontology for the FCS;
receiving, by the first SDT, a potential threat object (PTO);
mapping the PTO to an enterprise attack vector pattern;
searching, by the first SDT, using historical routines associated with a second SDT of an other computer system (OCS), for a predicted attack pattern meeting a similarity criteria threshold respective to the enterprise attack vector pattern, wherein the similarity criteria threshold is a percentage of commonality between the associated security ontology for the FCS and an associated security ontology for the OCS; and
responsive to finding the predicted attack pattern:
locating an action mitigation plan (AMP) related to the predicted attack pattern in a data fabric associated with the second SDT of the OCS;
copying the OCS predicted attack pattern to an FCS predicted attack pattern store;
copying the OCS AMP to an FCS AMP store; and
defending the FCS from the PTO using the AMP.

2. The computer-implemented method of claim 1, further comprising:
during the creating of the first SDT:
determining sensitive information of the FCS;
performing an action selected from the group consisting of: partially encrypting and fully encrypting, the sensitive information to produce encrypted sensitive data; and
including the encrypted sensitive data in place of the sensitive information in the SDT.

3. The computer-implemented method of claim 1, further comprising:
sending the PTO to a potential threat analyzer by an entity selected from the group consisting of: a pen tester and a live log analyzer.

4. The computer-implemented method of claim 1, further comprising:
mapping the PTO to an enterprise attack vector (EAV).

5. The computer-implemented method of claim 4, further comprising:
mapping the EAV into a Structured Threat Information Expression (STIX) protocol for searching.

6. The computer-implemented method of claim 1, wherein the OCS is a plurality of other computer systems.

7. The computer-implemented method of claim 1, wherein the search routines integrate with no code-zero code capabilities that permit further investigation by security administrators for a selection from the group consisting of: a predicted attack pattern and a mitigation plan.

8. A computer system comprising:
a processor set;
one or more computer-readable storage media; and
program instructions stored on the one or more computer-readable storage media to cause the processor set to perform operations comprising:
a creating a first security digital twin (SDT) for a focus computer system (FCS) with an associated security ontology for the FCS;
receiving, by first SDT, a potential threat object (PTO);
mapping the PTO to an enterprise attack vector pattern;
searching, by the first SDT, using historical routines associated with a second SDT of an other computer system (OCS), for a predicted attack pattern meeting a similarity criteria threshold respective to the enterprise attack vector pattern, wherein the similarity criteria threshold is a percentage of commonality between the associated security ontology for the FCS and an associated security ontology for the OCS; and
responsive to finding the predicted attack pattern:
locating an action mitigation plan (AMP) related to the predicted attack pattern in a data fabric associated with the second SDT of the OCS;
copying the OCS predicted attack pattern to an FCS predicted attack pattern store;
copying the OCS AMP to an FCS AMP store; and defending the FCS from the PTO using the AMP.

9. The computer system of claim 8, wherein the operations further comprise:
during the creating of the first SDT:
determining sensitive information of the FCS;
performing an action selected from the group consisting of: partially encrypting and fully encrypting, the sensitive information to produce encrypted sensitive data; and
including the encrypted sensitive data in place of the sensitive information in the SDT.

10. The computer system of claim 8, wherein the operations further comprise:
sending the PTO to a potential threat analyzer by an entity selected from the group consisting of: a pen tester and a live log analyzer.

11. The computer system of claim 8, wherein the operations further comprise:
mapping the PTO to an enterprise attack vector (EAV).

12. The computer system of claim 11, wherein the operations further comprise:
mapping the EAV into a Structured Threat Information Expression (STIX) protocol for searching.

13. The computer system of claim 8, wherein the OCS is a plurality of other computer systems.

14. The computer system of claim 8, wherein the search routines integrate with no code-zero code capabilities that permit further investigation by security administrators for a selection from the group consisting of: a predicted attack pattern and a mitigation plan.

15. A computer program product comprising:
one or more computer-readable storage media; and
program instructions stored on the one or more computer-readable storage media to perform operations comprising:
creating a first security digital twin (SDT) for a focus computer system (FCS) with an associated security ontology for the FCS;
receiving, by the first SDT, a potential threat object (PTO);
mapping the PTO to an enterprise attack vector pattern;
searching, by the first SDT, using historical routines associated with a second SDT of another computer system (OCS), for a predicted attack pattern meeting a similarity criteria threshold respective to the enterprise attack vector pattern, wherein the similarity criteria threshold is a percentage of commonality between the associated security ontology for the FCS and an associated security ontology for the OCS; and
responsive to finding the predicted attack pattern:
locating an action mitigation plan (AMP) related to the predicted attack pattern in a data fabric associated with the second SDT of the OCS;
copying the OCS predicted attack pattern to an FCS predicted attack pattern store;
copying the OCS AMP to an FCS AMP store;
and defending the FCS from the PTO using the AMP.

16. The computer program product of claim 15, wherein the operations further comprise:
mapping the PTO to an enterprise attack vector (EAV); and
mapping the EAV into a Structured Threat Information Expression (STIX) protocol for searching.

17. The computer program product of claim 15 wherein the operations further comprise:
during the creating of the first SDT:
determining sensitive information of the FCS;
performing an action selected from the group consisting of: partially encrypting and fully encrypting, the sensitive information to produce encrypted sensitive data; and
including the encrypted sensitive data in place of the sensitive information in the SDT.

\* \* \* \* \*